(12) United States Patent
Matsumoto et al.

(10) Patent No.: US 10,994,420 B2
(45) Date of Patent: May 4, 2021

(54) ROBOT

(71) Applicant: Toyota Jidosha Kabushiki Kaisha, Toyota (JP)

(72) Inventors: Issei Matsumoto, Toyota (JP); Tatsuro Mori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 311 days.

(21) Appl. No.: 16/267,588

(22) Filed: Feb. 5, 2019

(65) Prior Publication Data
US 2019/0240836 A1    Aug. 8, 2019

(30) Foreign Application Priority Data
Feb. 6, 2018 (JP) .............................. JP2018-019616

(51) Int. Cl.
*B25J 19/06* (2006.01)
*B25J 9/16* (2006.01)
*B25J 19/02* (2006.01)

(52) U.S. Cl.
CPC ............. *B25J 9/1676* (2013.01); *B25J 19/06* (2013.01); *B25J 19/022* (2013.01); *B25J 19/027* (2013.01)

(58) Field of Classification Search
CPC ............ A61B 2560/0223; H04W 4/38; G06F 11/0721; G06F 3/0659; G06N 20/00; H04N 13/246; B25J 9/026; B25J 9/1612; B25J 13/08; B25J 19/06; G05B 19/401; G05B 19/4182; B66F 9/24
See application file for complete search history.

(56) References Cited

U.S. PATENT DOCUMENTS

| | | | |
|---|---|---|---|
| 8,798,790 B2* | 8/2014 | Kamiya | G05B 19/401 700/245 |
| 10,232,512 B2* | 3/2019 | Ooba | G05B 19/4182 |
| 10,335,963 B2* | 7/2019 | Nakazato | B25J 9/1612 |
| 10,423,154 B2* | 9/2019 | Iwatake | B25J 13/08 |
| 2013/0338829 A1 | 12/2013 | Schlaich et al. | |
| 2018/0327196 A1* | 11/2018 | Sullivan | B66F 9/24 |

FOREIGN PATENT DOCUMENTS

JP    2013-545625 A    12/2013

OTHER PUBLICATIONS

Roshni et al., Pick and Place Robot Using the Centre of Gravity Value of the Moving Object, 2017,IEEE, p. 1-5 (Year: 2017).*

* cited by examiner

*Primary Examiner* — McDieunel Marc
(74) *Attorney, Agent, or Firm* — Dinsmore & Shohl LLP

(57) ABSTRACT

A robot with a noncontact sensor is configured to: perform the predetermined motion in a state where the moving object does not enter, and thereby store, for each of a plurality of measurement points set in a movable range of the robot, an output value of the noncontact sensor as a reference output value in advance, and stop the predetermined motion when the output value of the noncontact sensor changes from the reference output value at the measurement point closest to a current operating position of the robot by a first threshold value or larger when the robot is performing the predetermined motion in a state where the moving object could possibly enter and the current operating position of the robot is in a range in which it is necessary to determine an entering state of the moving object.

4 Claims, 11 Drawing Sheets

ROBOT

CROSS REFERENCE TO RELATED APPLICATIONS

This application is based upon and claims the benefit of priority from Japanese patent application No. 2018-019616, filed on Feb. 6, 2018, the disclosure of which is incorporated herein in its entirety by reference.

BACKGROUND

The present disclosure relates to a robot and, in particular, an industrial robot.

A robot equipped with a mechanism for detecting that a moving object such as a person has entered an area near the robot has been known. In the above-described robot, a noncontact sensor such as a capacitive sensor is usually used as a sensor for detecting that a moving object has entered an area near the robot. Japanese Unexamined Patent Application Publication No. 2013-545625 discloses a robot including a first sensor device that serves as a noncontact sensor that reacts when a person is present within a first detection range, and a second sensor device that serves as another noncontact sensor that reacts when a person is present within a second detection range. In the robot disclosed in Japanese Unexamined Patent Application Publication No. 2013-545625, when only the first sensor device reacts, the robot reduces its motion speed and continues the operation at the reduced motion speed. Further, when the second sensor device also reacts, the robot further reduces its motion speed or reduces it to a standstill state.

SUMMARY

The present inventors have found the following problem. The above-described noncontact sensor is affected by disturbances from the surrounding environment and the influence of the disturbances on the noncontact sensor may change depending on the position where the robot operates (hereinafter referred to as an operating position of the robot). In such cases, in the robot disclosed in Japanese Unexamined Patent Application Publication No. 2013-545625, there is a possibility that the robot might not be able to correctly detect that a moving object has entered an area near the robot depending on the operating position of the robot. Note that the operating position of the robot means any position where the robot may move to when the robot is performing a predetermined operation.

The present disclosure has been made in view of the above-described background and an object thereof is to provide a robot capable of reducing the influence of disturbances that its noncontact sensor receives from the surrounding environment irrespective of the operating position of the robot.

A first exemplary aspect is a robot including a noncontact sensor configured to detect an entrance of a moving object, the robot being configured to perform a predetermined motion, in which the robot is further configured to: perform the predetermined motion in a state where the moving object does not enter, and thereby store, for each of a plurality of measurement points set in a movable range of the robot, an output value of the noncontact sensor as a reference output value in advance, and stop the predetermined motion when the output value of the noncontact sensor changes from the reference output value at the measurement point closest to a current operating position of the robot by a first threshold value or larger when the robot is performing the predetermined motion in a state where the moving object could possibly enter and the current operating position of the robot is in a range in which it is necessary to determine an entering state of the moving object.

Since the output value of the noncontact sensor is compared with the reference output value at the measurement point closest to the current operating position and the determination is made based on the amount of the change in the output value from the reference output value, the influence of disturbances from the surrounding environment is cancelled out according to the operating position of the robot. In this way, it is possible to reduce the influence of disturbances that the noncontact sensor receives from the surrounding environment irrespective of the operating position of the robot.

Further, the robot performs at least one of reducing a motion speed of the predetermined motion and issuing a warning when the output value of the noncontact sensor changes from the reference output value at the measurement point closest to the current operating position of the robot by a value that is smaller than the first threshold value and equal to or larger than a second threshold value smaller than the first threshold value when the robot is performing the predetermined motion in the state where the moving object could possibly enter.

When there is no possibility of an imminent collision between the robot and the moving object, the robot merely reduce the motion speed and/or issue the warning, so that the robot can eliminate the possibility of the collision between the robot and the moving object without frequently stopping the motion of the robot.

According to the present disclosure, it is possible to reduce the influence of disturbances that the noncontact sensor receives from the surrounding environment irrespective of the operating position of the robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to the drawings. For clarifying the explanation, the following description and the drawings are partially omitted and simplified as appropriate. The same symbols are assigned to the same elements throughout the drawings and duplicated explanations are omitted as appropriate.

First Embodiment

Firstly, a schematic configuration of a robot 1 according to a first embodiment is described with reference to FIG. 1. In this example, the robot 1 is an industrial robot, i.e., an automatic-control programmable manipulator having three degrees of freedom or more.

Figure 1:
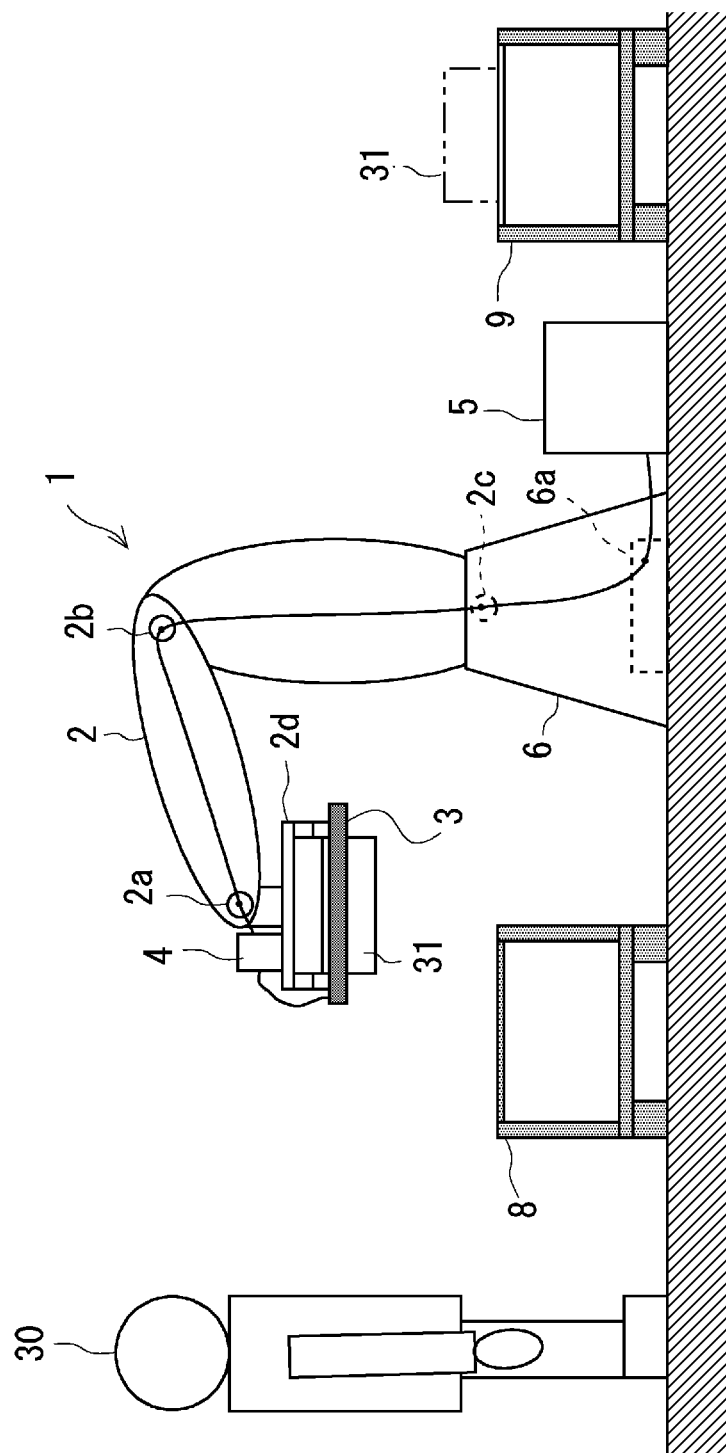
FIG. 1 is a schematic diagram showing a schematic configuration of a robot according to a first embodiment.

FIG. 1 is a schematic diagram showing a schematic configuration of the robot 1 according to the first embodiment. In this example, the robot 1 is a transporting robot for transporting workpieces 31 placed on a placement table 9 to a workbench 8, on which a person (e.g., a worker) 30 performs work such as machining for the workpieces 31. As shown in FIG. 1, the robot 1 includes a robot arm 2, a noncontact sensor 3, a control unit 4, a robot control panel 5, and a rotary pedestal 6.

The robot arm 2 includes three joints (a first joint 2a, a second joint 2b, and a third joint 2c) and a grasping part 2d disposed at its tip. Each of the first, second and third joints 2a, 2b and 2c includes an actuator for driving the joint such as a servomotor (not shown) and a rotation sensor for detecting rotation information of the actuator such as an encoder (not shown). The robot arm 2 is attached to the rotary pedestal 6. The rotary pedestal 6 includes a rotating mechanism 6a equipped with an actuator such as a servomotor, and is configured to freely rotate with respect to a ground contact surface. Further, the rotary pedestal 6 also includes a rotation sensor for detecting rotation information of the actuator such as an encoder (not shown).

The noncontact sensor 3 is a sensor for detecting an entrance of a person 30, which is a moving object, and is formed as a capacitive sensor element. The noncontact sensor 3 is disposed near the grasping part 2d disposed at the tip of the robot arm 2. A principle on which the robot 1 detects an entrance of a moving object by using the noncontact sensor 3 will be described later. Further, the control unit 4 that controls the noncontact sensor 3 is attached to the grasping part 2d.

The robot control panel 5 is provided for controlling motions of the robot arm 2 and movements of the rotary pedestal 6. The robot control panel 5 performs a forward kinematic calculation based on rotation information (such as a rotation angle) received from the rotation sensors of the first, second and third joints 2a, 2b and 2c, and rotation information (such as a rotation angle) received from the rotation sensor of the rotating mechanism 6a. By doing so, the robot control panel 5 calculates a position (a coordinate position) of a tool center point (TCP). Note that the TCP is a control point that is set for controlling the motion of the robot arm 2 and is usually set at a predetermined point at the tip of the robot arm 2 (the center of the grasping part 2d in this example). During a predetermined motion, the robot control panel 5 receives signals from the rotation sensors disposed in the first, second and third joints 2a, 2b and 2c, respectively, and the rotation sensor disposed in the rotating mechanism 6a, and calculates the coordinate position of the TCP at predetermined intervals (e.g., 100 ms). Further, the robot control panel 5 exchanges signals with the control unit 4. Details of the signal exchanges between the robot control panel 5 and the control unit 4 and processes performed in the control unit 4 will be described later.

Figure 2:
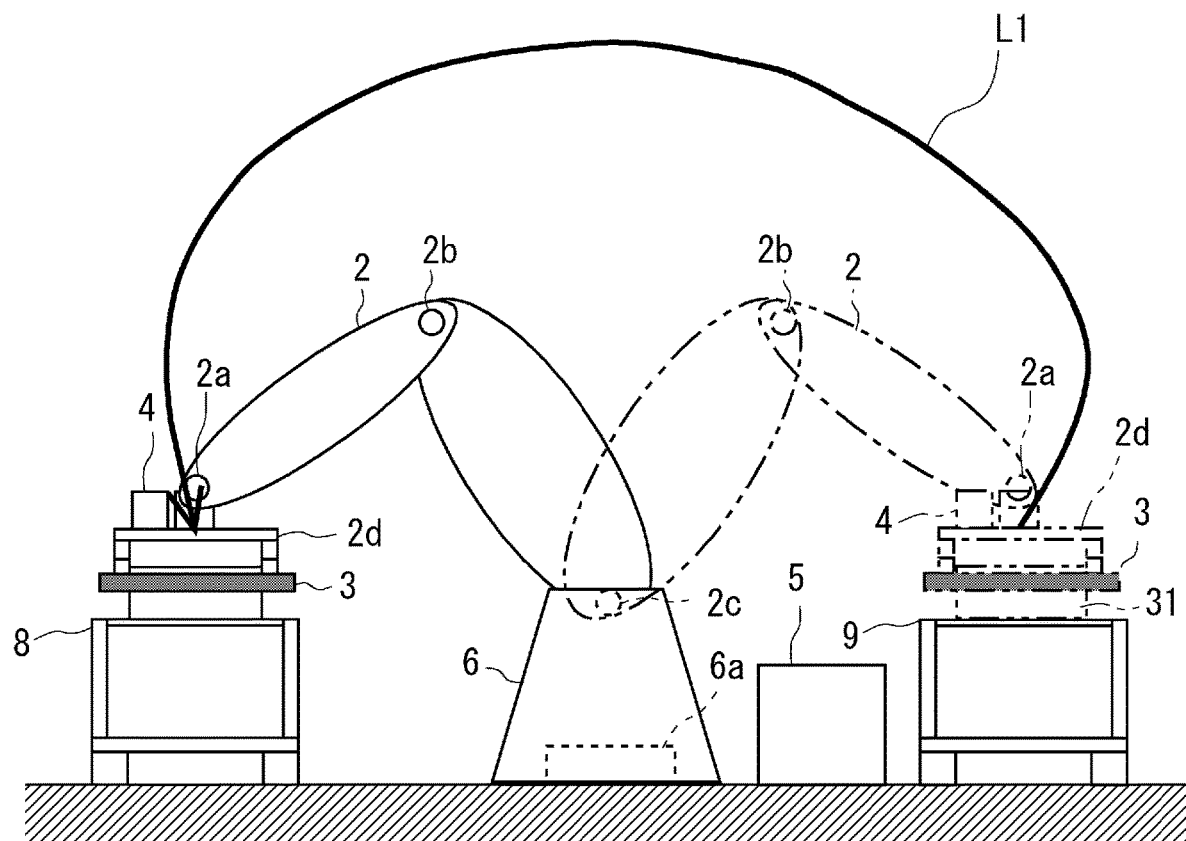
FIG. 2 is a schematic diagram for explaining operating positions of the robot according to the first embodiment.

FIG. 2 is a schematic diagram for explaining operating positions of the robot 1. The robot 1 performs a predetermined motion in a manufacturing process. Note that the predetermined motion is a series of movements for transporting a workpiece 31 placed on the placement table 9 to the workbench 8, on which a person (e.g., a worker) 30 performs work such as machining for the workpiece 31. As shown in FIG. 2, in the predetermined operation, the robot 1 is controlled by the robot control panel 5 so that the coordinate position of the TCP located at the tip of the robot arm 2 moves along a predetermined trajectory L1.

Figure 3:
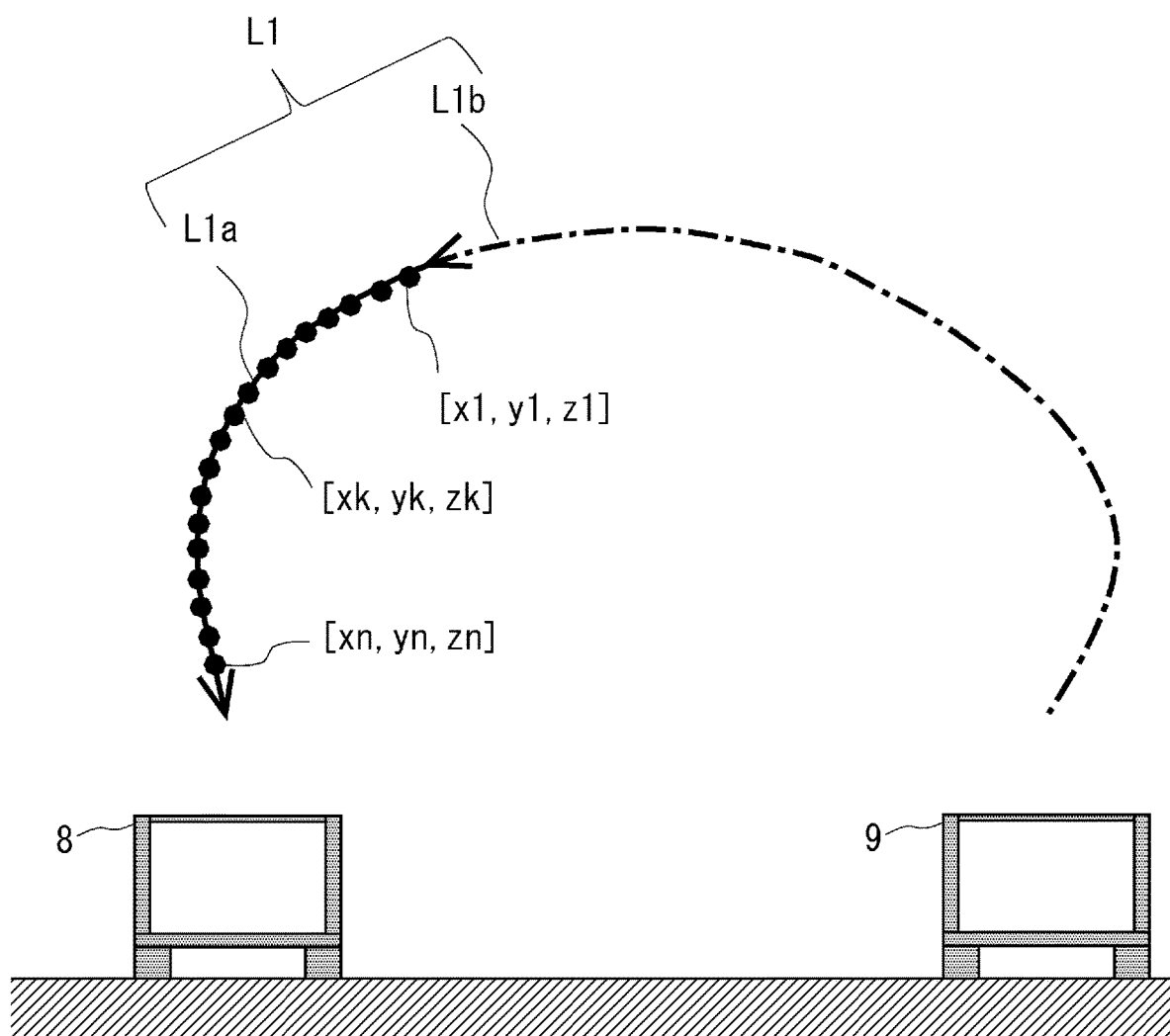
FIG. 3 is a schematic diagram for explaining an effective region of a determination process on a trajectory of a TCP of a robot arm of the robot according to the first embodiment.

FIG. 3 is a schematic diagram for explaining an effective region of a determination process on the trajectory L1 of the TCP of the robot arm 2. As shown in FIG. 3, in a trajectory region L1b indicated by an alternate long and short dashed line in the trajectory L1, a distance between the coordinate position of the TCP of the robot arm 2 and the coordinate position of the workbench 8 is sufficiently large. That is, there is no risk that the person 30, which is the moving object (see FIG. 1), could be caught between the workbench 8 and the tip of the robot arm 2 in the trajectory region L1b, so that the process for determining the entering state of the moving object is disabled. In contrast to this, in a trajectory region L1a indicated by a solid line in the trajectory L1, the distance between the coordinate position of the TCP of the robot arm 2 and the coordinate position of the workbench 8 is relatively small. That is, there is a risk that the person 30 could be caught between the workbench 8 and the tip of the robot arm 2 in the trajectory region L1a, so that the process for determining the entering state of the moving object is enabled. Note that a plurality of measurement points (indicated by circles), which will be described later, are set in the trajectory region L1a.

Figure 4:
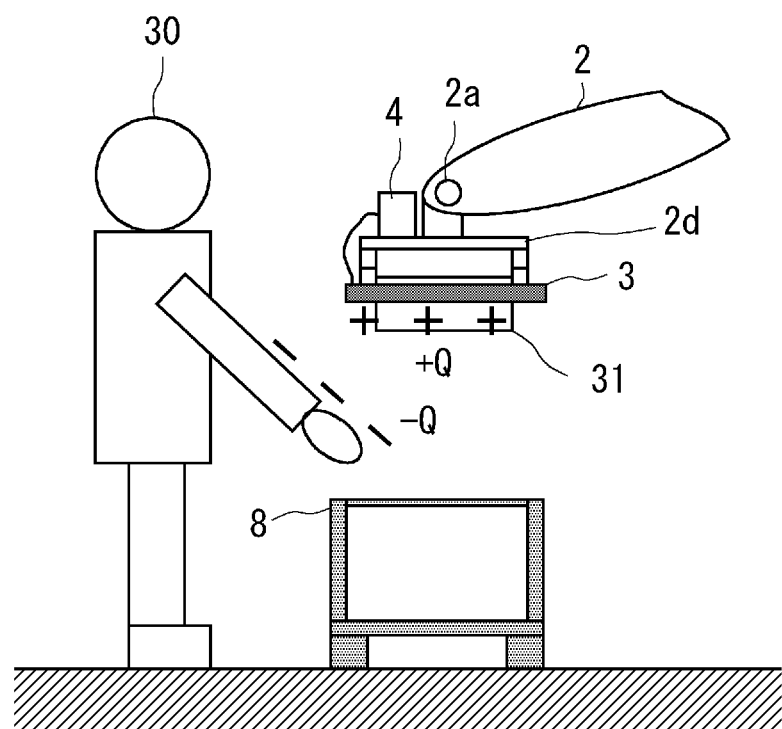
FIG. 4 is a schematic diagram for explaining a principle on which the robot according to the first embodiment detects an entrance of a person, which is a moving object, by using a noncontact sensor.

FIG. 4 is a schematic diagram for explaining a principle on which the robot 1 detects an entrance of a person 30, which is the moving object, by using the noncontact sensor 3. Since the person 30 is a conductor, a capacitor is formed by the noncontact sensor 3 and the person 30. Therefore, as shown in FIG. 4, when the person 30 approaches the noncontact sensor 3, the noncontact sensor 3 is charged with a positive charge +Q and the person 30 is charged with a negative charge −Q. The closer the person 30 approaches the noncontact sensor 3, the more the amount of charge (hereinafter also referred to as the charge amount) in the noncontact sensor 3 increases. Since the voltage between the person 30 and the noncontact sensor 3 is maintained constant, as the charge amount in the noncontact sensor 3 increases, the capacitance of the noncontact sensor 3, which is an output value of the noncontact sensor 3, increases. That is, the closer the person 30 approaches the noncontact sensor 3, the larger the amount of change (hereinafter also referred to as the change amount) in the output value of the noncontact sensor 3 becomes. Therefore, it is possible to determine how close the person 30 has approached the noncontact sensor 3 based on the change amount in the output value of the noncontact sensor 3.

Next, details of signal exchanges between the robot control panel 5 and the control unit 4, and processes performed in the control unit 4 are described.

Figure 5:
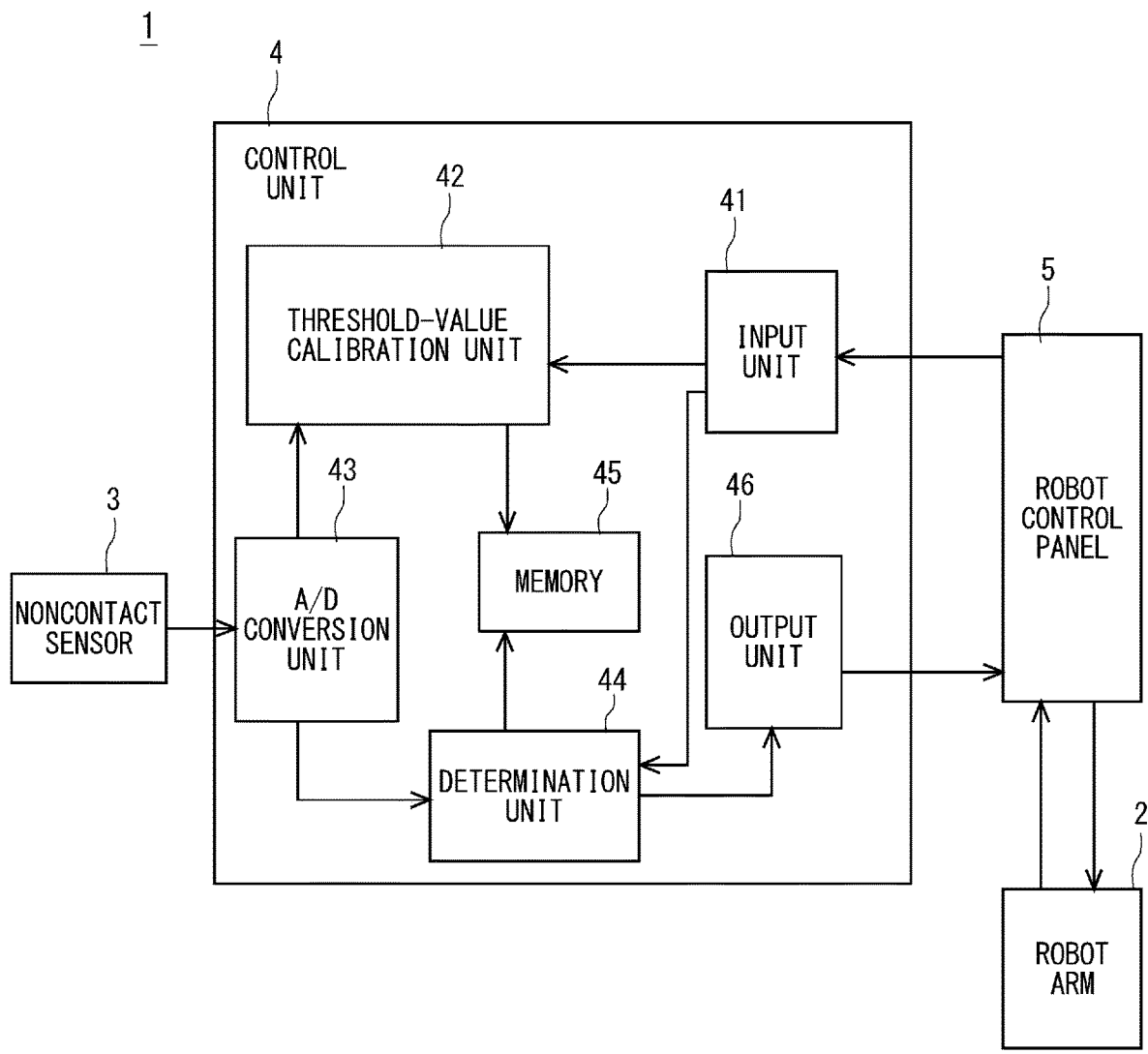
FIG. 5 is a control block diagram of the robot according to the first embodiment.

FIG. 5 is a control block diagram of the robot 1. As shown in FIG. 5, the control unit 4 includes an input unit 41, a threshold-value calibration unit 42, an A/D conversion unit 43, a determination unit 44, a memory 45, and an output unit 46.

The input unit 41 receives, from the robot control panel 5, information about the coordinate position of the TCP, a selected control mode of the robot 1, and information as to whether the determination process for the entering state of the moving object should be enabled or disabled.

As the control mode of the robot 1, there are two modes, i.e., a threshold-value calibration mode and a normal mode. The threshold-value calibration mode is a mode which is performed before an actual manufacturing process is performed, and in which the robot 1 performs a predetermined motion in a state where no person 30, i.e., no moving object enters an area near the robot 1 and thereby stores, for each of a plurality of measurement points set in a movable range of the robot 1, an output value of the noncontact sensor 3 as a reference output value. Note that the plurality of measurement points set in the movable range of the robot 1 are, for example, coordinate positions [xk, yk, zk] (k=1 to n) of the TCP located in the trajectory region L1b of the trajectory L1 indicated by circles in FIG. 3.

When the threshold-value calibration mode is selected, the input unit 41 transmits information about the coordinate positions of the TCP to the threshold-value calibration unit 42. Then, in the threshold-value calibration unit 42, each of the reference output values acquired from the noncontact sensor 3 through the A/D conversion unit 43 is associated with a coordinate position of the corresponding measurement point (a coordinate position of the TCP at the time when that reference output value is acquired) and stored in the memory 45. Note that the A/D conversion unit 43 is provided for converting analog signals output from the noncontact sensor 3 into digital signals.

In contrast, the normal mode is a mode which is performed in an actual manufacturing process, and in which the robot 1 performs a predetermined motion, i.e., a motion for transporting a workpiece. In the actual manufacturing process, since the person 30 and the robot 1 cooperate with each other, there is a possibility that the person 30, which is the moving object, enters an area near the robot 1 when the robot 1 is performing the predetermined motion. When the normal mode is selected, the input unit 41 transmits information about the coordinate position of the TCP and information as to whether the determination process for the entering state of the moving object should be enabled or disabled to the determination unit 44. That is, when the normal mode is being performed, the input unit 41 transmits information about the coordinate position of the TCP and information as to whether the determination process for the entering state of the moving object should be enabled or disabled to the determination unit 44. When the current operating position of the robot 1 is in a range in which it is necessary to determine the entering state of the moving object, the robot control panel 5 transmits information indicating that the aforementioned determination process should be enabled to the determination unit 44 through the input unit 41. On the other hand, when the current operating position of the robot 1 is not in the range in which it is necessary to determine the entering state of the moving object, the robot control panel 5 transmits information indicating that the aforementioned determination process should be disabled to the determination unit 44 through the input unit 41. Note that the range in which it is necessary to determine the entering state of the moving object means a range in which the robot 1 is in the vicinity of the workbench 8, on which the person 30, which is the moving object, is working. That is, it means that the coordinate position of the TCP is located in the trajectory region L1b of the trajectory L1 shown in FIG. 3. Note that the input unit 41 is provided for performing communication for transmitting signals received from the robot control panel 5 to the determination unit 44.

When the determination unit 44 receives information indicating that the determination process for the entering state of the moving object should be enabled from the input unit 41, the determination unit 44 refers to the memory 45. Then, when the output value acquired from the noncontact sensor 3 through the A/D conversion unit 43 has changed from the reference output value at the measurement point closest to the current operating position of the robot 1, which is stored in the memory 45, by a first threshold value or larger, the determination unit 44 issues an instruction to the robot control panel 5 through the output unit 46 so that the robot 1 stops the predetermined motion. Further, when the output value has changed from the reference output value at the measurement point closest to the current operating position by a value that is smaller than the first threshold value and equal to or larger than a second threshold value, the determination unit 44 issues an instruction to the robot control panel 5 through the output unit 46 so that the robot 1 performs at least one of reducing a motion speed of the predetermined motion and issuing a warning. Note that the second threshold value is smaller than the first threshold value. Further, the output unit 46 is provided for performing communication for transmitting signals received from the determination unit 44 to the robot control panel 5.

Figure 6:
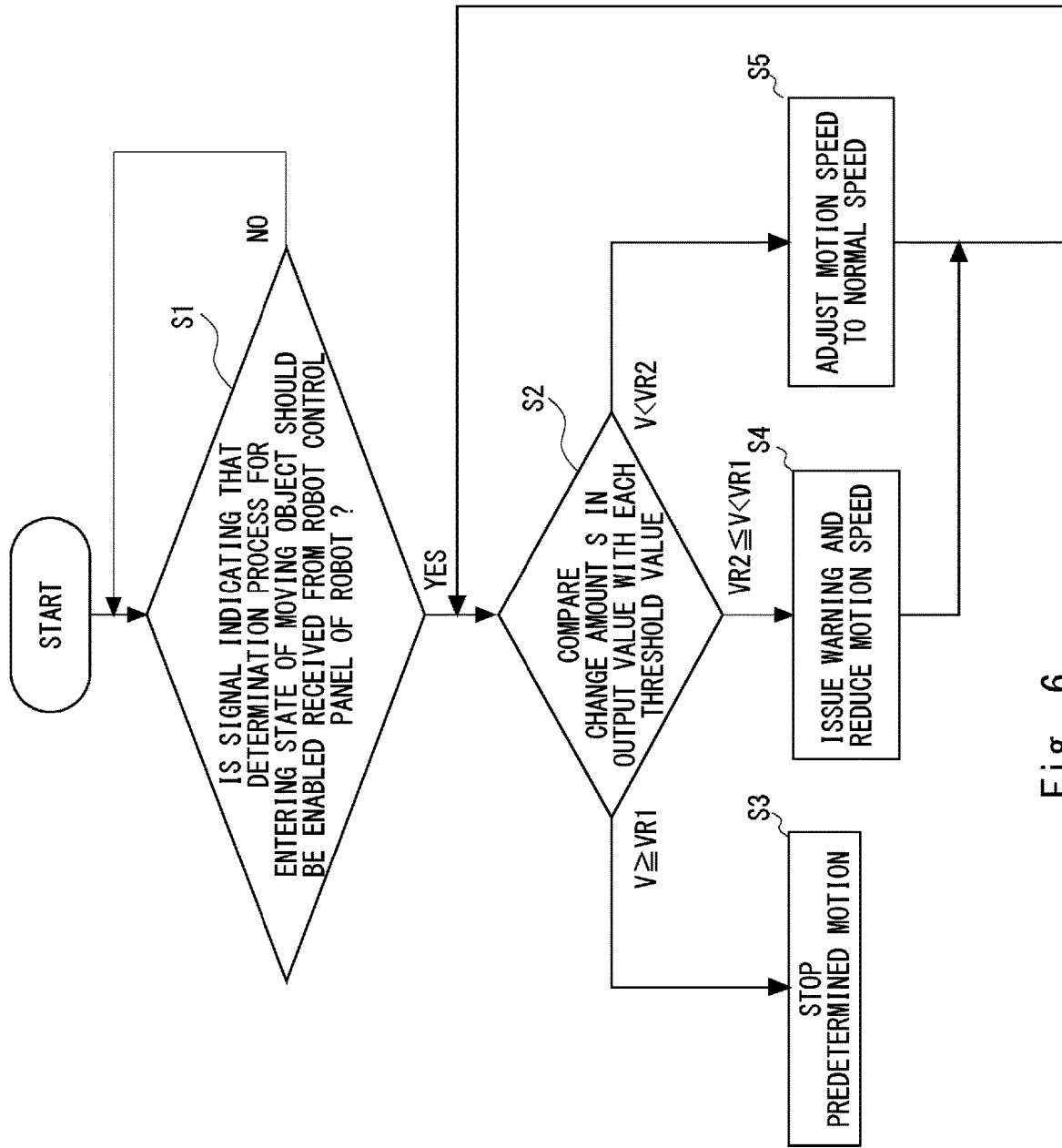
FIG. 6 is a flowchart showing a flow of processes for determining an entering state of a moving object performed in the robot according to the first embodiment.

FIG. 6 is a flowchart showing a flow of processes for determining the entering state of the moving object. As shown in FIG. 6, firstly, the robot 1 determines whether or not a signal indicating that the determination process for the entering state of the moving object should be enabled has been received from the robot control panel 5 (step S1). When the signal indicating that the determination process for the entering state of the moving object should be enabled has been received from the robot control panel 5 in the step S1 (i.e., in the case of Yes), the robot 1 compares a change amount V in the output value with each of the threshold values (VR1 and VR2) (step S2).

When the change amount V in the output value is equal to or larger than the first threshold value VR1 (V≥VR1) in the step S2, the robot 1 stops the predetermined motion (step S3). When the change amount V in the output value is equal to or larger than the second threshold value VR2 and smaller than the first threshold value VR1 (VR2≤V<VR1) in the step S2, the robot 1 issues a warning, reduces the motion speed (step S4), and returns to the process in the step S2. When the change amount V in the output value is smaller than the second threshold value VR2 (V<VR2) in the step S2, the robot 1 adjusts the motion speed to a normal speed (step S5) and returns to the process in the step S2.

As described above, the robot 1 according to this embodiment performs the predetermined motion in the state where no moving object enters the area near the robot 1 in the threshold-value calibration mode in advance. Then, the robot 1 stores, for each of the plurality of measurement points set in the movable range of the robot 1, an output value of the noncontact sensor 3 as a reference output value in the memory while associating the reference output value with the coordinate position of the corresponding measurement point.

Further, in the normal mode, when the current operating position of the robot 1 is in the range in which it is necessary to determine the entering state of the moving object, the robot 1 compares the output value of the noncontact sensor 3 with the reference output value. Then, when the output value of the noncontact sensor 3 has changed from the reference output value at the measurement point closest to the current operating position of the robot 1 by the first reverence value or larger, the robot 1 stops the predetermined motion.

Since the output value of the noncontact sensor 3 is compared with the reference output value at the measurement point closest to the current operating position and the determination is made based on the change amount in the output value from the reference output value, the influence of disturbances from the surrounding environment is cancelled out according to the operating position of the robot 1. In this way, it is possible to reduce the influence of disturbances that the noncontact sensor receives from the surrounding environment irrespective of the operating position of the robot.

In the normal mode, when the output value of the noncontact sensor has changed from the reference output value at the measurement point closest to the current operating position of the robot by a value that is smaller than the first threshold value and equal to or larger than the second threshold value, the robot 1 performs at least one of reducing the motion speed of the predetermined motion and issuing a warning. When there is no possibility of an imminent collision between the robot 1 and the moving object, the robot 1 merely reduces the motion speed and/or issues the warning. As a result, the robot 1 can eliminate the possibility of the collision between the robot 1 and the moving object without frequently stopping the motion of the robot 1.

Second Embodiment

Figure 7:
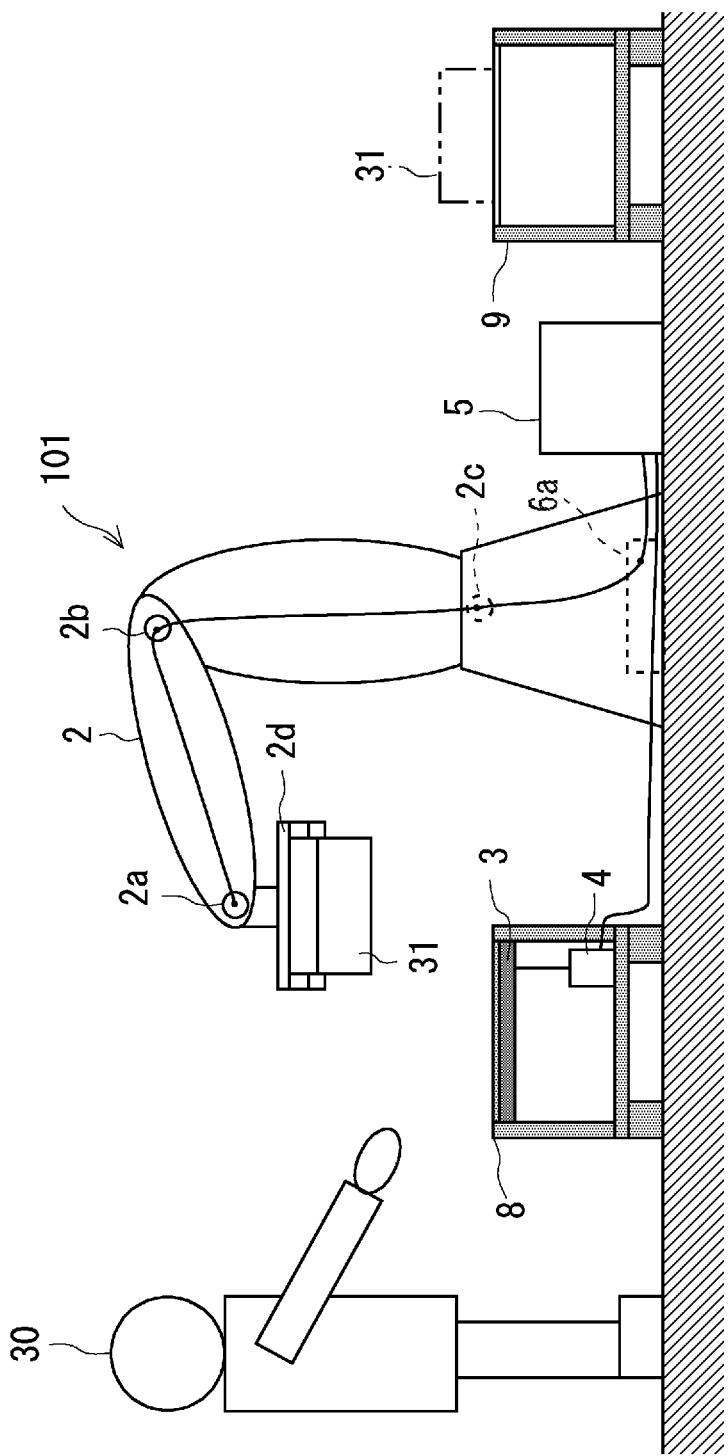
FIG. 7 is a schematic diagram showing a schematic configuration of a robot according to a second embodiment.

FIG. 7 is a schematic diagram showing a schematic configuration of a robot 101 according to a second embodiment. The difference from the robot 1 according to the first embodiment (see FIG. 1) is the place where the noncontact sensor 3 is disposed. As shown in FIG. 7, the noncontact sensor 3 is mounted on the top surface of the workbench 8 in the robot 101.

Figure 8:
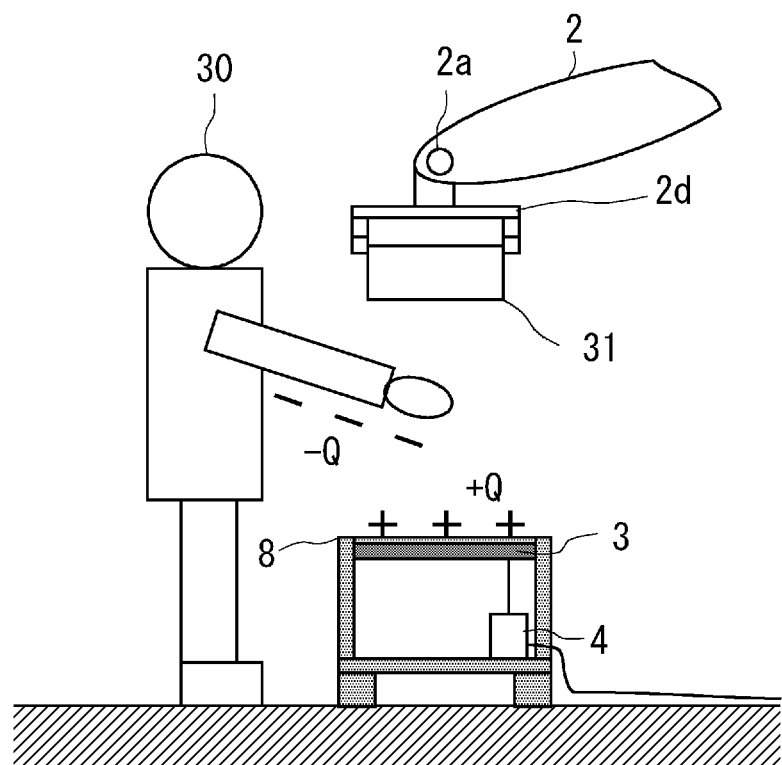
FIG. 8 is a schematic diagram for explaining a principle on which the robot detects an entrance of a person, which is a moving object, by a noncontact sensor.

FIG. 8 is a schematic diagram for explaining a principle on which the robot 101 detects an entrance of a person 30, which is the moving object, by using the noncontact sensor 3. As shown in FIG. 8, even when the noncontact sensor 3 is mounted on the top surface of the workbench 8, as the person 30 approaches the noncontact sensor 3, the noncontact sensor 3 is charged with a positive charge +Q and the person 30 is charged with a negative charge −Q as in the case of the first embodiment shown in FIG. 4. The closer the person 30 approaches the noncontact sensor 3, the more the charge amount in the noncontact sensor 3 increases and the more the capacitance of the noncontact sensor 3, which is the output value of the noncontact sensor 3, increases. Therefore, it is possible to determine how close the person 30 has approached the noncontact sensor 3 based on the change amount in the output value of the noncontact sensor 3.

A control block diagram of the robot 101 is the same as that in the first embodiment shown in FIG. 5. Further, the flow of processes for determining the entering state of the moving object performed in the robot 101 is the same as that in the first embodiment shown in FIG. 6. By the above-described configuration, it is possible to reduce the influence of disturbances that the noncontact sensor receives from the surrounding environment irrespective of the operating position of the robot as in the case of the robot 1 according to the first embodiment.

Third Embodiment

Figure 9:
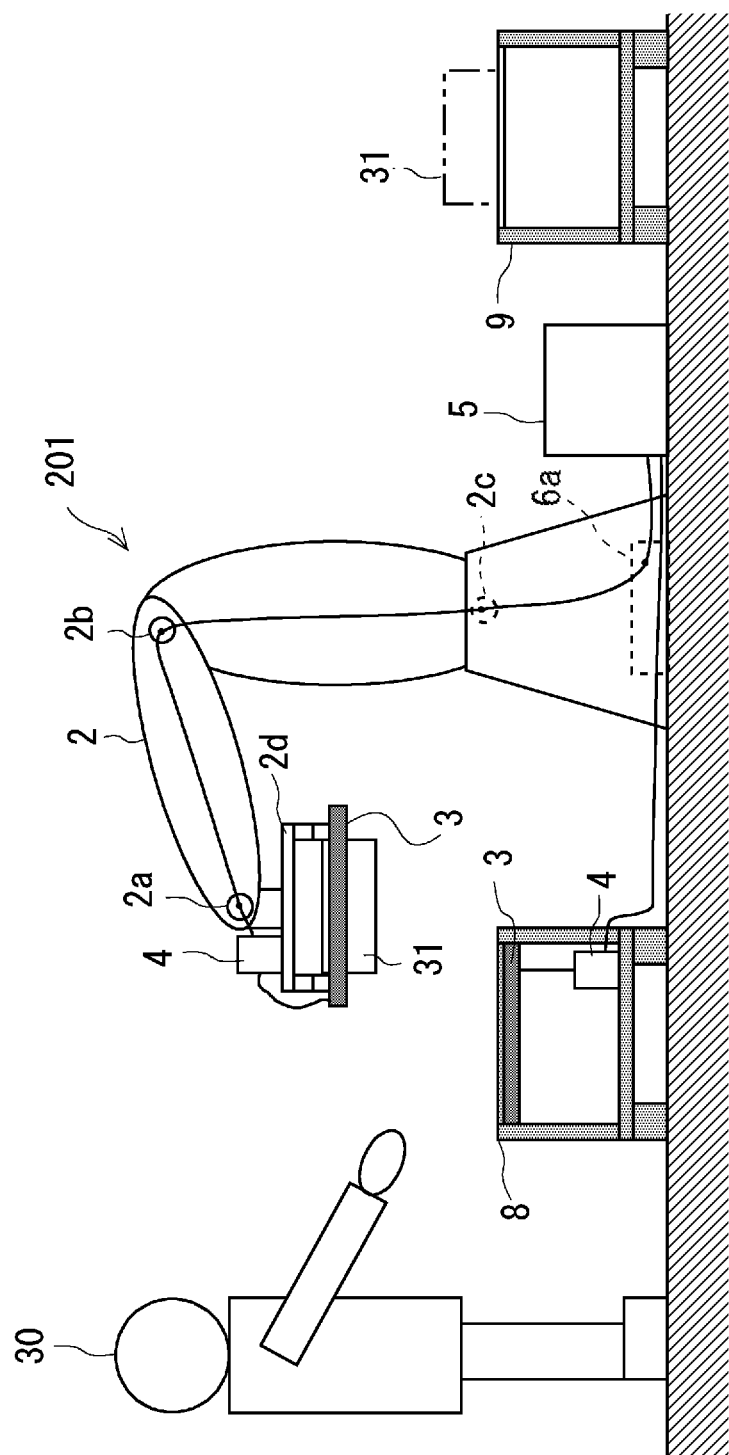
FIG. 9 is a schematic diagram showing a schematic configuration of a robot according to a third embodiment.

FIG. 9 is a schematic diagram showing a schematic configuration of a robot 201 according to a third embodiment. The difference from the robot 1 according to the first embodiment (see FIG. 1) is the place where the noncontact sensor 3 is disposed. As shown in FIG. 9, a noncontact sensor 3 is mounted on each of a place near the grasping part 2d of the robot arm 2 and the top surface of the workbench 8 in the robot 201.

Figure 10:
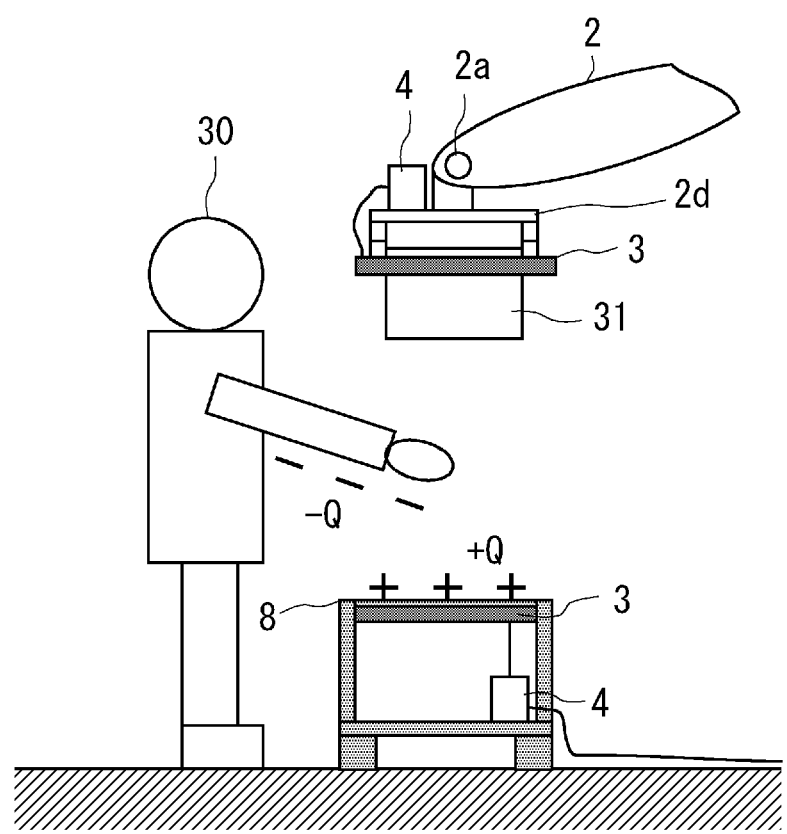
FIG. 10 is a schematic diagram for explaining a method for detecting an entrance of a moving object performed in the robot according to the third embodiment.
Figure 11:
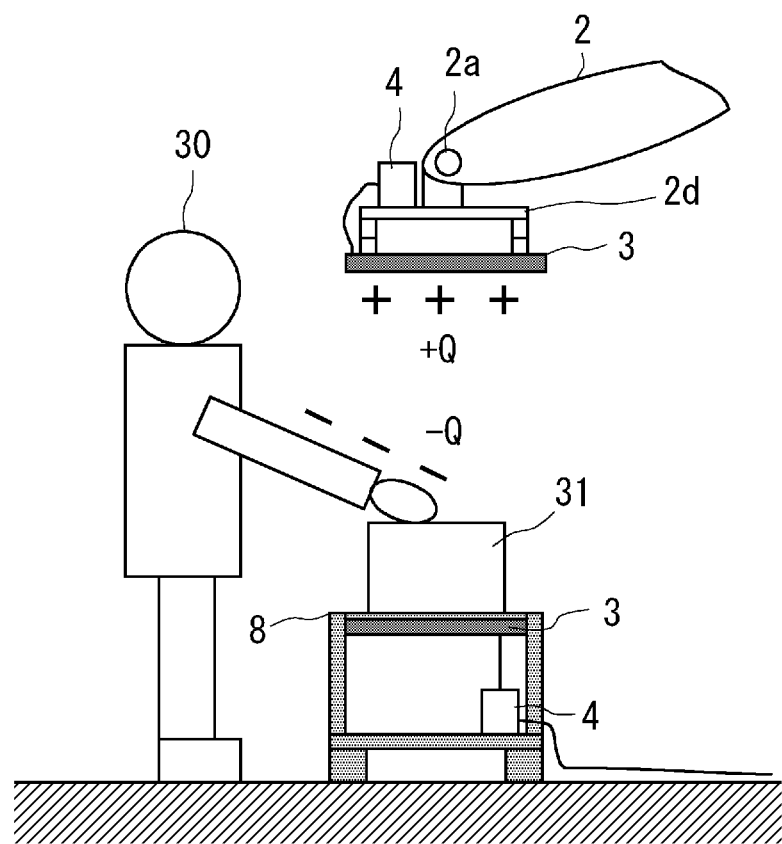
FIG. 11 is a schematic diagram for explaining a method for detecting an entrance of a moving object performed in the robot according to the third embodiment.

FIGS. 10 and 11 are schematic diagrams for explaining a method for detecting an entrance of a moving object performed in the robot 201 according to the third embodiment.

As shown in FIG. 10, in the case where the length of the workpiece 31 in the vertical direction is large, when the robot arm 2 places the workpiece 31, the workpiece 31 grasped by the grasping part 2d of the robot arm 2 acts as an obstacle for the capacitor formed by the noncontact sensor 3 attached to the grasping part 2d and the person 30. Consequently, in some cases, it is impossible to accurately detect the capacitance between the noncontact sensor 3 attached to the grasping part 2d of the robot arm 2 and the person 30. Therefore, in the robot 201, when the robot arm 2 places the workpiece 31, the noncontact sensor 3 attached to the grasping part 2d of the robot arm 2 is disabled and the noncontact sensor 3 attached to the workbench 8 is enabled. That is, in the robot 201, when the robot arm 2 places the workpiece 31, the noncontact sensor 3 attached to the workbench 8 detects an entrance of the person 30, which is the moving object.

As shown in FIG. 11, in the case where the length of the workpiece 31 in the vertical direction is large, when the robot arm 2 picks up the workpiece 31, the workpiece 31 placed on the top surface of the workbench 8 acts as an obstacle for the capacitor formed by the noncontact sensor 3 attached to the workbench 8 and the person 30. Consequently, in some cases, it is impossible to accurately detect the capacitance between the noncontact sensor 3 attached to the top surface of the workbench 8 and the person 30. Therefore, in the robot 201, when the robot arm 2 picks up the workpiece 31, the noncontact sensor 3 attached to the grasping part 2d of the robot arm 2 is enabled and the noncontact sensor 3 attached to the workbench 8 is disabled. That is, in the robot 201, when the robot arm 2 picks up the workpiece 31, the noncontact sensor 3 attached to the grasping part 2d of the robot arm 2 detects an entrance of the person 30, which is the moving object.

In this way, even in the case where the length of the workpiece 31 in the vertical direction is large, it is possible to reliably prevent the person 30 from being caught between the workpiece 31, which is the moving object, and the top surface of the workbench 8, or being caught between the top surface of the workpiece 31 placed on the workbench 8 and the grasping part 2d of the robot arm 2.

Note that the present disclosure is not limited to the above-described embodiments, and various modifications can be made without departing the spirit and scope of the present disclosure.

Although the robot arm in the robot includes the grasping part in the above-described embodiments, the present disclosure is not limited to such configurations. For example, the robot may be an industrial robot whose robot arm includes no grasping part, such as a painting robot or a screw tightening robot.

In the above-described embodiments, the predetermined motion in the transporting robot is a series of movements for transporting a workpiece placed on a placement table to a workbench, on which a person (e.g., a worker) performs work such as machining for the workpiece. However, the predetermined motion of the robot is not limited to such motions. For example, in the case of the aforementioned painting robot, the predetermined motion is a series of movements for painting a predetermined part of a workpiece. Further, in the case of the screw tightening robot, the predetermined motion is a series of operation for tightening a screw in a predetermined part of a workpiece.

Although the above-described embodiments are described on the assumption that the noncontact sensor is formed as a capacitive sensor element, the present disclosure is not limited to such configurations. For example, the noncontact sensor may be a laser displacement sensor that measures a distance to an obstacle by irradiating the obstacle with a laser beam, or a magnetic sensor that detects an obstacle based on magnetic disturbances. Similarly to the processes in the noncontact sensor in the above-described embodiments (see FIG. 6), an entrance of a moving object is determined by comparing a change amount in an output value with a threshold value(s) (first and second thresholds). Further, various processes such as stopping a predetermined motion, issuing a warning, and reducing a motion speed are performed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot comprising a noncontact sensor configured to detect an entrance of a moving object, the robot being configured to perform a predetermined motion, wherein the robot is further configured to:
    perform the predetermined motion in a state where the moving object does not enter, and thereby store, for each of a plurality of measurement points set in a movable range of the robot, an output value of the noncontact sensor as a reference output value in advance, and
    stop the predetermined motion when the output value of the noncontact sensor changes from the reference output value at the measurement point closest to a current operating position of the robot by a first threshold value or larger when the robot is performing the predetermined motion in a state where the moving object could possibly enter and the current operating position of the robot is in a range in which it is necessary to determine an entering state of the moving object.

2. The robot according to claim 1, wherein the robot performs at least one of reducing a motion speed of the predetermined motion and issuing a warning when the output value of the noncontact sensor changes from the reference output value at the measurement point closest to the current operating position of the robot by a value that is smaller than the first threshold value and equal to or larger than a second threshold value smaller than the first threshold value when the robot is performing the predetermined motion in the state where the moving object could possibly enter.

3. A method for controlling a robot configured to perform a predetermined motion, the method comprising:
    providing a noncontact sensor configured to detect an entrance of a moving object,
    perform the predetermined motion in a state where the moving object does not enter, and thereby store, for each of a plurality of measurement points set in a movable range of the robot, an output value of the noncontact sensor as a reference output value in advance, and
    stop the predetermined motion when the output value of the noncontact sensor changes from the reference output value at the measurement point closest to a current operating position of the robot by a first threshold value or larger when the robot is performing the predetermined motion in a state where the moving object could possibly enter and the current operating position of the robot is in a range in which it is necessary to determine an entering state of the moving object.

4. The method according to claim 3, wherein the robot performs at least one of reducing a motion speed of the predetermined motion and issuing a warning when the output value of the noncontact sensor changes from the reference output value at the measurement point closest to the current operating position of the robot by a value that is smaller than the first threshold value and equal to or larger than a second threshold value smaller than the first threshold value when the robot is performing the predetermined motion in the state where the moving object could possibly enter.

* * * * *